UNITED STATES PATENT OFFICE.

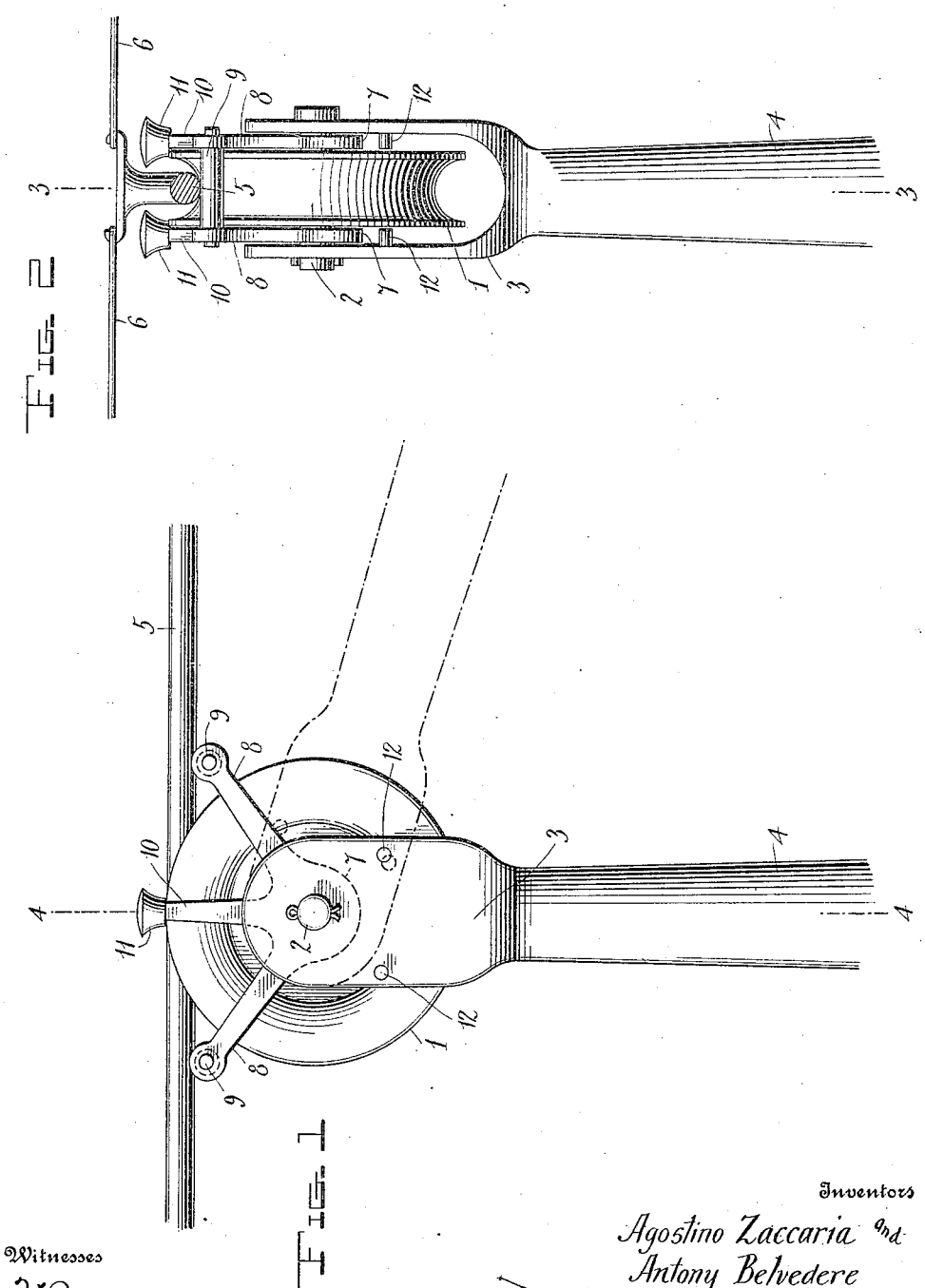

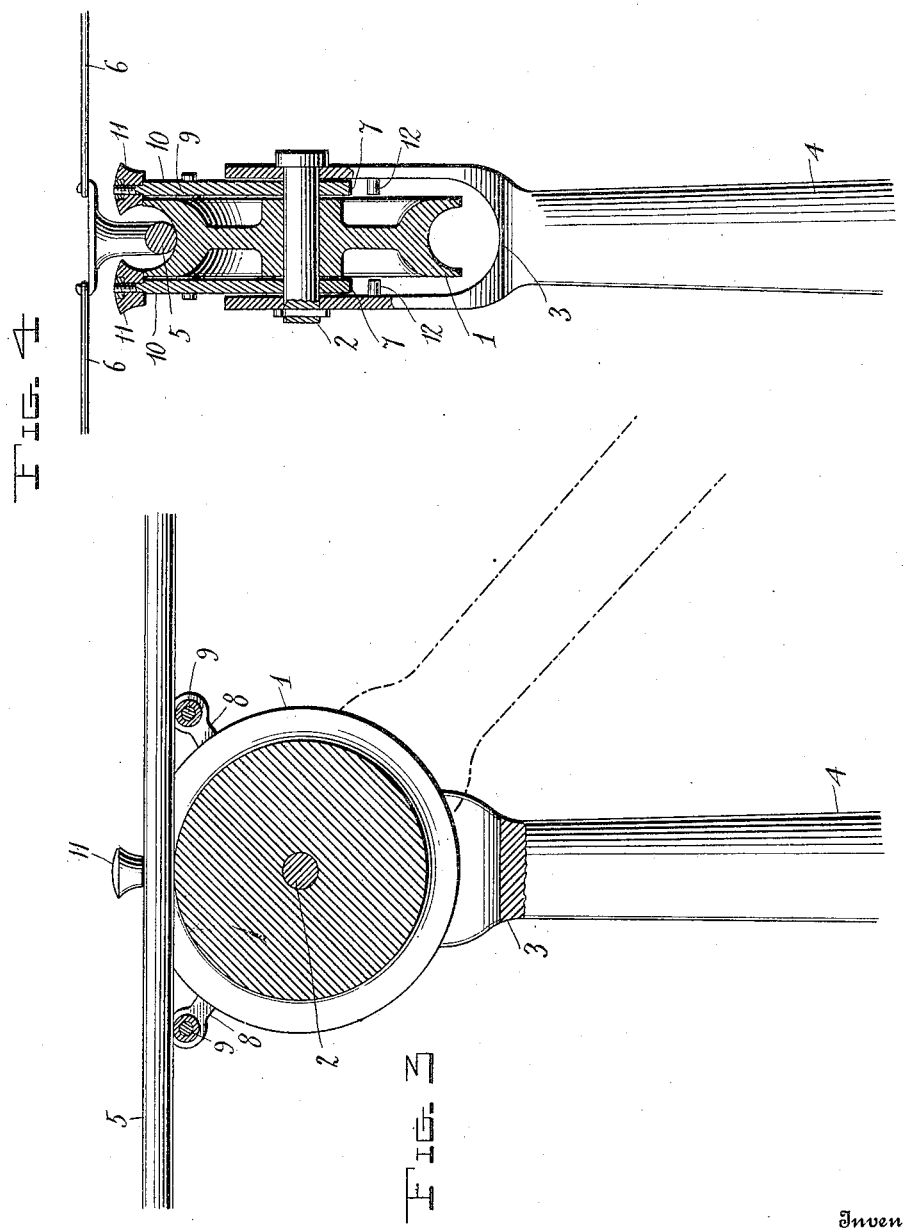

AGOSTINO ZACCARIA AND ANTONY BELVEDERE, OF UNIONTOWN, PENNSYLVANIA.

CAR-TROLLEY.

No. 917,396.          Specification of Letters Patent.          Patented April 6, 1909.

Application filed June 9, 1908. Serial No. 437,565.

*To all whom it may concern:*

Be it known that we, AGOSTINO ZACCARIA and ANTONY BELVEDERE, subjects of the King of Italy, residing at Uniontown, in the county of Fayette, State of Pennsylvania, have invented certain new and useful Improvements in Car-Trolleys; and we do hereby declare the following to be a full, clear, and exact description of the invention, such as will enable others skilled in the art to which it appertains to make and use the same.

This invention has relation specifically to trolleys for overhead wires of electric cars; and it has for its object the provision of improvements that will prevent the trolley from "jumping" or leaving the wire, and consequently obviate accidents consequent thereon.

The invention consists of the improved parts and combination of parts herein shown, described and claimed.

The drawings hereunto annexed form a part of this specification and represent the invention in the best form now contemplated of constructing and using it, though it is recognized that changes may be made in the design and arrangement of parts without departing from the general nature and spirit of the invention.

Of the said drawings, Figure 1 is a side elevation of the invention. Fig. 2 is an end view. Fig. 3 is a section taken in the plane 3—3, Fig. 2. Fig. 4 is a section taken in the plane 4—4, Fig. 1.

Similar characters of reference designate similar parts and features in all of the views.

In the drawings, 1 designates the trolley-wheel, which, *per se*, is of usual construction, and turns on the journal pin 2, supported in the harp 3, that is mounted on the pole 4.

5 is the line or current wire on which the trolley-wheel 1 runs. The said current wire is supported from transverse wires 6.

7 designates tri-armed devices supported on the journal pin 2 between the sides of the trolley-wheel and the harp, two of which arms 8 on each side of the wheel diverge, their ends extending up to the current wire, and are provided with bearings for the ends of rollers 9 which run on the current wire 5. There is one roller before and one behind the trolley-wheel and they operate to preserve the equilibrium of the wheel and harp. The other arms 10 of the device 7 extend vertically up from the journal pin 2 and have wheels 11 with curved or concave sides journaled on their upper ends, normally out of contact with the current wire, but in position to keep the latter down and in proper position laterally should the wheel from any cause be moved with an inclination to jump the current wire. The upper ends of what may be called the safety-wheels 11 are of greater diameter than their lower ends, thus fitting them in the best manner to perform the functions ascribed to them.

12 designates stop pins connected with the inner sides of the harp 3, and extending laterally therefrom and adapted to come into contact with the arms 8 of the device 7, and thus limit the movement of the said device on the axle 2.

In Fig. 2 the pole and harp are shown by full lines in vertical position, while the dotted lines represent them as inclined.

The prime purpose of the invention is to maintain the trolley-wheel on the current wire 5, and keep it from jumping or leaving the same, and considering its purpose and functions it is exceedingly simple of construction.

What is claimed, is:—

1. A device of the kind described comprising a pair of oppositely disposed members each having a body portion and arms outwardly diverging from said body portion, and an arm 3 extending from said body portion between the first mentioned arms of each member, a roller connecting each outwardly diverging arm of one member with the corresponding arm of the oppositely disposed member, and other rollers carried on the outer ends of the last mentioned arms and substantially in alinement therewith.

2. The combination with a trolley harp and its pin and wheel, of a pair of opposed members supported on said pin at opposite ends thereof, said members each comprising a pair of diverging arms, the arms of one member being in radial alinement with the arms on the other member, rollers connecting the free ends of the arms of one member with the corresponding arms of the other member and adapted to contact with the underside of a current wire, a third arm on each of said members extending from the body portion intermediate the other arms of the respective member, and a roller supported on each of the last mentioned arms and substantially in axial alinement therewith.

3. The combination with the current wire, the trolley-wheel, its journal pin and harp supported on the said pin, of a device supported on the pin and provided with two divergent arms between the sides of the wheel and harp and extending up to the current wire and provided on their ends with rollers in contact with the wire, combined with pins extending laterally from the inner sides of the harp and adapted to limit the position of the trolley-wheel support.

In testimony whereof, we affix our signatures, in presence of two witnesses.

AGOSTINO ZACCARIA.
ANTONY BELVEDERE.

Witnesses:
   CHARLES HUSSO,
   ANDREW PALLADINO.